CHARACTER RECOGNITION BY MULTIPLE READING
Original Filed June 8, 1964 4 Sheets-Sheet 1
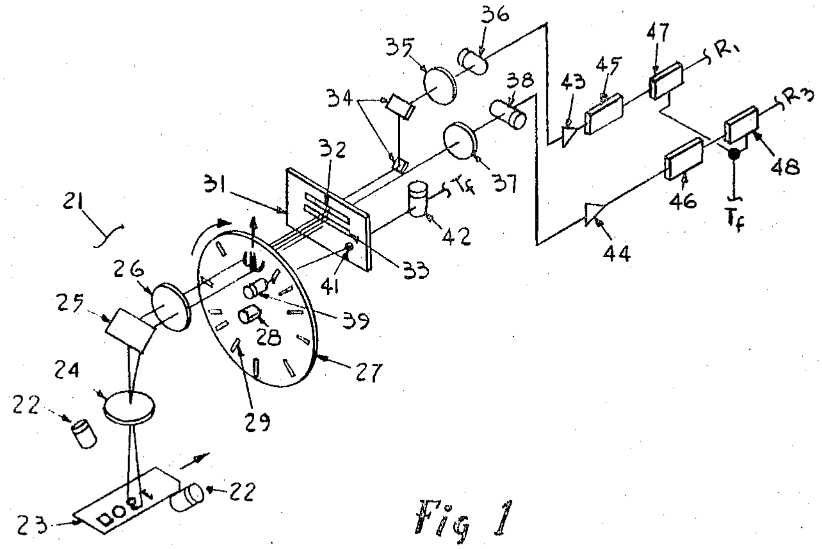
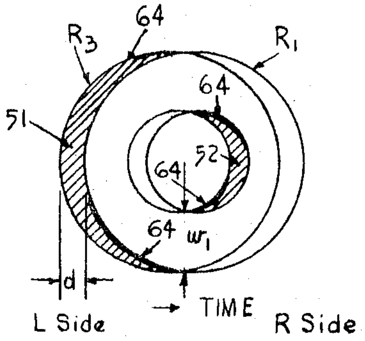
Fig 2
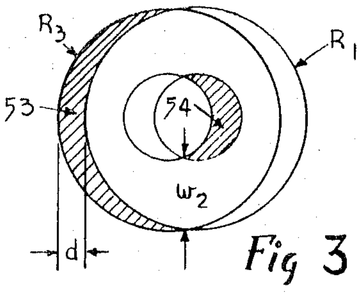
Fig 3
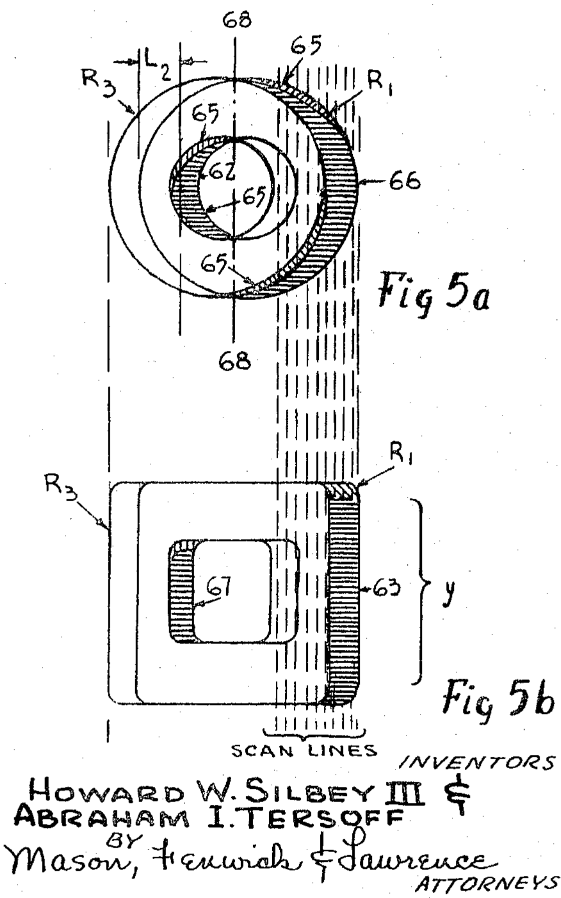
Fig 5a Fig 5b
INVENTORS
HOWARD W. SILBEY III &
ABRAHAM I. TERSOFF
BY
Mason, Fenwick & Lawrence
ATTORNEYS Jan. 30, 1968 H. W. SILSBY 3RD, ETAL 3,366,926

CHARACTER RECOGNITION BY MULTIPLE READING

Original Filed June 8, 1964 4 Sheets-Sheet 2

CHARACTER RECOGNITION BY MULTIPLE READING

Original Filed June 8, 1964 4 Sheets-Sheet 3

United States Patent Office 3,366,926
Patented Jan. 30, 1968

3,366,926

CHARACTER RECOGNITION BY MULTIPLE READING

Howard W. Silsby III, Annandale, Va., and Abraham I. Tersoff, Washington, D.C., assignors to Farrington Electronics, Inc., Alexandria, Va., a corporation of Massachusetts Continuation of application Ser. No. 373,237, June 8, 1964. This application Sept. 15, 1966, Ser. No. 579,782
14 Claims. (Cl. 340—146.3)

ABSTRACT OF THE DISCLOSURE

Character recognition apparatus is provided wherein the character to be recognized is scanned two times, the second scan of each character being delayed with respect to the first scan of the character by an amount no greater than the minimum stroke width of the character being scanned and recognized. The characters are moved past a reading station where they are successively imaged by an appropriate optical projection system on to a peripheral area of a rotating disk having a plurality of radially extending slits spaced at equal intervals around the above mentioned peripheral area of the disk. Disposed behind the peripheral area of the rotating disks are two slits which extend in a direction orthogonal to the direction the radial slits of the disk assume when transversing the area where the characters are imaged. As each radial slit crosses an imaged character, a slice of the character is successively emitted from the two orthogonal slits respectively to two photo detector tubes. That is, because of the movement of the character through the reading station, its image also moves across the peripheral area of the rotating disk; thus, some of the slices of the character are emitted from a first of the two orthogonal slits before any slices are passed through the second of the slits. The spacing between the slits is predetermined and corresponds to the minimum anticipated stroke width of the characters to be recognized. Thus, there is emitted from each of the two orthogonal slits a plurality of slices corresponding to the total character being scanned, the slices emitted from the second slit commencing in time before the slices emitted from the first slit end, thereby providing two complete scans of a character where the scans overlap in time.

The two scan signals are next subjected to logical subtraction operations. That is, one of the scan signals is logically inverted and then applied to an AND circuit together with the other scan signal which is not inverted. Thus, the output signal from the AND circuit corresponds to those areas where the first and second scan signals do not overlap. Each of the characters to be scanned will produce different non-overlap patterns which are peculiar thereto. Thus, the output of the AND circuit when applied to appropriate recognition circuitry for distinguishing the different non-overlap patterns provides appropriate output signals which respectively correspond to the characters being recognized.

*Cross references to relating applications*

This application is a continuation of U.S. application Ser. No. 373,237, filed June 8, 1964, and now abandoned, the inventors and the assignee of the present application being the same as the above-mentioned copending application.

The present invention relates in general to improvements in methods and apparatus for interpreting intelligence in accordance with decisions made on the basis of information sensed from the intelligence, and more particularly to methods and apparatus for producing and recognizing distinct intelligence features and/or patterns from two duplicate electrical scanning signals representative of the same intelligence yet depicting the same at two different points in time.

Briefly, the present invention relates to improvements in interpreter apparatus of the type arranged for scanning information such as printed characters, and other intelligence-bearing items with respect to a variable time base, detecting the absence or presence of electrical signals representing unique features or patterns facilitating identification of the characters to recognize the intelligence being scanned. The above is accomplished in the present invention by producing a first set of electrical signals from scanning a character image and a second set duplicating the first set of electrical signals at a different predetermined point in time relative to the commencement of the first set, with portions of the electrical signals of the two sets overlapping in time, then performing logical operations on the composite electrical signals to result in electrical signals representative of unique features and/or patterns of a character.

The invention has application particularly to the production of machines which will accept signals from an input device scanning a printed page such as a typewritten page and producing signals in accordance with the unique features and/or patterns of the characters being scanned and ignoring the unimportant features, whereby the signals are interpreted to recognize each character being scanned by the input device, and produce an output representative thereof.

An object of the present invention is the provision of novel methods and apparatus in optical character scanning devices for producing unique patterns.

Another object of the present invention is the provision of novel methods and apparatus in optical character scanning devices for recognizing unique character features and/or patterns.

Another object of the present invention is the provision of novel methods and apparatus in optical character scanning devices by producing a plurality of signal sets at different points in time, each of which are representative of a character being scanned, the two sets having time-overlapping portions, for producing and/or recognizing unique patterns facilitating identification of the characters.

Other objects, advantages and capabilities of the present invention will become apparent from the following detail description, taken in conjunction with the accompanying drawings, showing only preferred embodiments of the invention.

In the drawings:

FIGURE 1 is a schematic illustration of one form of an optical scanning arrangement used in the present invention;

FIGURE 2 is an illustration pictorially representing the composite time spaced $R_1$ and $R_3$ electrical signals indicative of a character being scanned;

FIGURE 3 shows another composite pictorial representation of the time spaced $R_1$ and $R_3$ signals indicative of a character being scanned;

Figure 7:
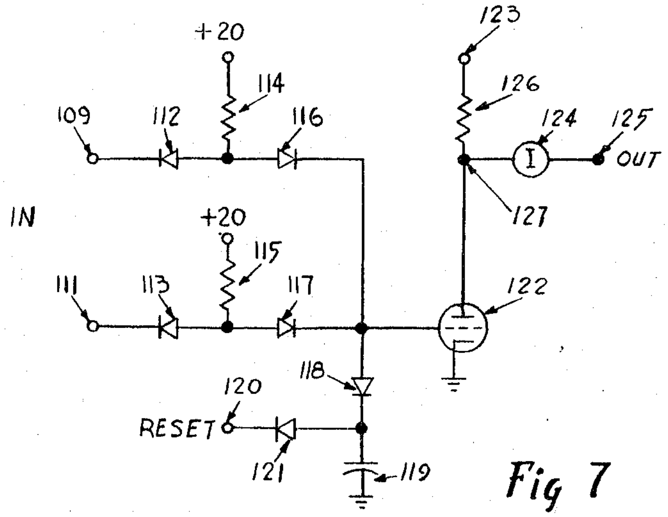
Figure 6:
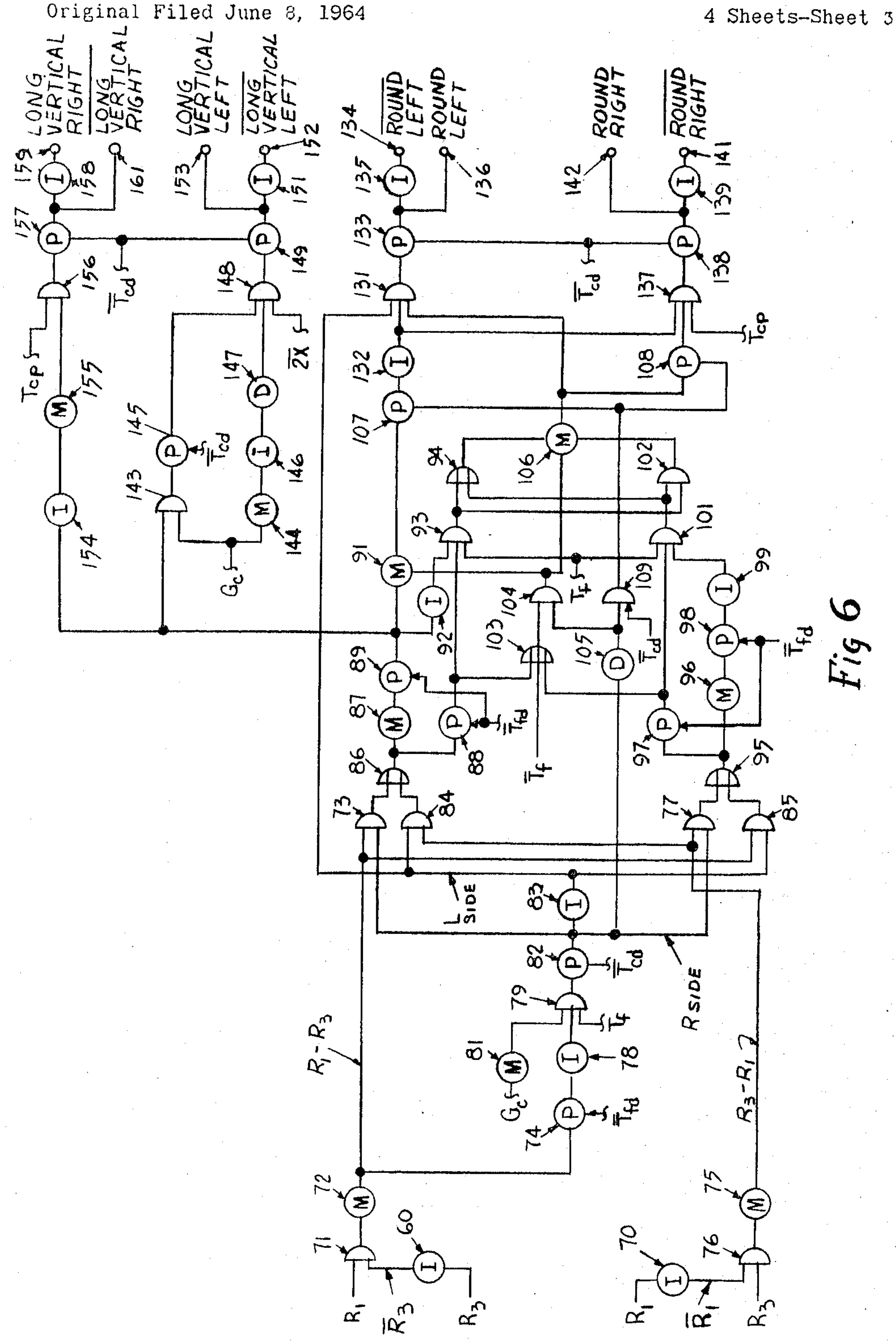
Figure 8:
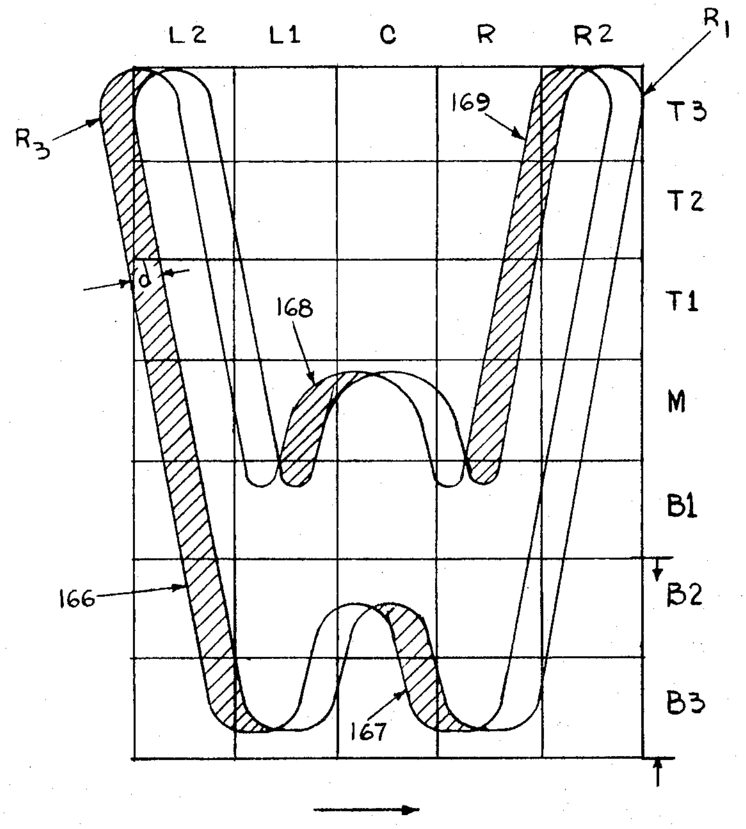

FIGURE 5*a* and 5*b* illustrate still another composite pictorial representation of time spaced $R_1$ and $R_3$ signals indicative of the characters being scanned;

FIGURE 6 is an embodiment of a detailed schematic circuit diagram employed in the present invention;

FIGURE 7 shows the detailed schematic circuit diagram of a measuring unit utilized in the present invention; and FIGURE 8 illustrates an embodiment of the present invention showing the presence of various timing signals relative to a composite pictorial representation of time spaced $R_1$ and $R_3$ signals indicative of a character being scanned.

There is shown in FIGURE 1 an examplary scanning assembly, which is one of several forms that could be used with the apparatus herein. This scanning assembly, generally indicated by the reference character 21, is mounted directly over a feed track (not shown) of a suitable automatic document feed mechanism so that the optical center axis of scanning unit 21 is perependicular to the plane of the feed track with the optical center axis lying in the center of the scan zone from which information is to be read. The reading area is brightly illuminated by a pair of lamps 22.

Light reflected from the document 23 is focused by a focusing lens 24 and is redirected through an angle of ninety degrees by a first surface mirror 25, and thence through a correcting lens 26 to focus the image of the document on the plane of the scanning disk 27. The scanning disk is driven at a high speed about a central shaft 28 by suitable means. The scanning disk 28 is provided with a number of equally spaced radial slits 29 disposed near the periphery of the disk. In a preferred embodiment the scanning disk is a 7.5 inch diameter aluminum disk containing twenty 0.010 inch wide radial slits 29 spaced at equal intervals of approximately 18 degrees. The portion of the image which passes through the radial slits 29 in the scanning disk 27 falls upon a fixed plate 31 having a pair of parallel fixed slits 32 and 33 therein, the fixed slits being slightly shorter in length than the spacing between successive radial slits 29 of the scanning disk 27. In a preferred embodiment the width of each of fixed slits 32 and 33 is substantially 6 mils, and the distance between the center lines of the slits 32 and 33, is approximately 17 mils. The beam transmitted by the fixed slit 32 is directed via a pair of mirrors 34 and lens 35 onto the photocathode of a photomultiplier tube 36 to form an electrical signal designated as $R_1$, indicative of the image being scanned. Similarly, the beam transmitted by the fixed slit 33 is directed via lens 37 onto the photocathode of a photomultiplier tube 38 to form an electrical signal designated as $R_3$, indicative of the image being scanned.

In operation of the scanning unit 21, light from the illuminating lamps 22 is reflected from the surface of the document 23 as the document passes the reading station. As the image of the document at the reading station is focused on the plane of the scanning disk 27 in the path of the scanning disk radial slits 29, passage of a radial slit 29 through the image allows a thin slice of the image to fall upon the fixed plate 31. This thin slice travels across an elemental zone of the image, allowing a changing portion of the image to fall upon the fixed plate 31 as the disk 27 rotates. The portion of the radial image which intersects the fixed slit 32 is directed onto the photomultiplier 36, and the portion of the radial image which intersects the fixed slit 33 is directed to the photomultiplier 38. In the preferred embodiment approximately 25 to 30 scans may occur as one character passes the reading station.

Since the length of the fixed slits 32 and 33 are slightly less than the distance between the successive rotating slits, there is an interval after the completion of one scan and prior to the beginning of the next scan when no light passes through the scanning disk 27. This interval is called the "dark time" and the pulse which it causes is called the "black pulse."

Provision is also made in the scanning unit 21 for providing timing signals, designated $T_f$, which identify the end of each scanning frame. For this purpose an exciter lamp 39, having a directed beam of light, is mounted by suitable means in front of the scanner disk 27 at a position just prior to the intersection of an image by one of the rotary slits 29. The directed beam of light from the exciter lamp 39 is in registry with the path of the radial slits 29 of the scanning disk 27 to allow a narrow radial beam of light to pass through the slits 29 and thence through a hole 41 in the fixed plate 31 to a photocell 42 mounted in alignment with lamp 39 to thereby generate a timing signal $T_f$ each etime one of the scanning disk slits 29 passes fixed hole 41.

The respective output leads of photocells 36 and 39 are coupled to mutual amplifiers 43 and 44 and thence to respective quantizers or voltage discriminators 45 and 46 such as that shown in U.S. Patent No. 2,943,208 granted June 28, 1960, to D. H. Shepard et al., for producing an output signal only when the voltage level of the pulse coupled thereto from amplifiers 43 or 44 are above a critical threshold voltage which is arbitrarily set to correspond to a desired darkness or contrast level anticipated in the reading problem. Each quantizer 45 and 46, therefore, produces a constant voltage signal (recognition pulse) when a valid "hit" or inked area is detected by the respective photocells 36 and 38. The output of quantizers 45 and 46, is respectively coupled to clipper circuitry 47 and 48 to selectively cut out at time $T_f$ the large positive "black pulses" occurring during the period between the moving scanning slits, the output from the clippers 47 and 48 being the recognition signal $R_1$ and $R_3$ respectively.

Each of the signals $R_1$ and $R_3$ in its entirety, will represent a complete character being read by scanning unit 21. However, the signals each represent the character at a different period in time due to the spaced positioning of the fixed slits 32 and 33. It is readily apparent that fixed slit 33 will first transmit a portion of the character image slice passed by a radial slit 29, then fixed slit 32 will transmit that same portion of the character later in time, as the image is advanced by movement of the document 23 past the reading station. The composite character image represented by the electrical signals $R_1$ and $R_3$ is the equivalent of two images somewhat displaced with one substantially superimposed upon the other as shown in FIGURE 2, wherein the distance $d$ between the beginnings of the duplicate character images denotes the displacement of the character as electrically reproduced and represented by signals $R_1$ and $R_3$. It is noted that by providing a fixed distance between slits 32 and 33, the time equivalent of the distance $d$, displacing the two electrical signals representative of the character image being read, will remain a constant value regardless of substantial changes within the stroke width $w$ of the characters being scanned. This is clearly shown by comparing the characters disclosed in FIGURES 2 and 3 where the stroke width $w_2$ in FIGURE 3 is greater than the stroke width $w_1$ of the character illustrated in FIGURE 2.

In the preferred embodiment, the fixed distance between slits 32 and 33 has been selected to generally be slightly less than the minimum designed stroke width of the character images to be scanned. Subsequent to the selection of the fixed distance separating the adjacent slits, tests are performed to determine the present and/or absence of the features and/or patterns which are unique relative to the characters being scanned. It is understood, of course, that the fixed distance between slits 32 and 33 could, in other embodiments, greatly exceed the above limited value, whereby with each new selection of the fixed distance separating the slits, test would be performed to determine those features and/or patterns descriptive of the characters to be scanned.

Figure 4:
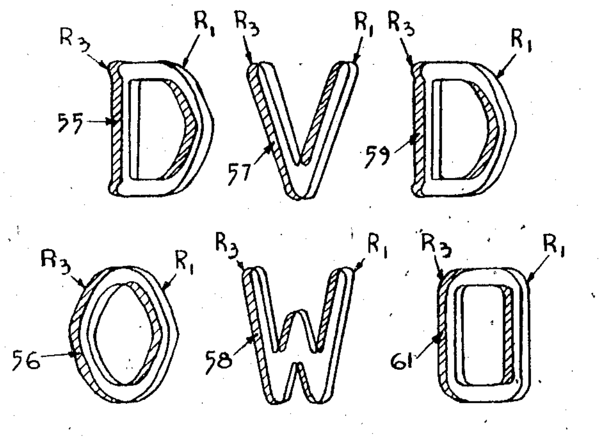
FIGURE 4 is an illustration of yet another composite pictorial representation of the time spaced $R_1$ and $R_3$ signals indicative of characters being scanned.

By performing logical operations, such as performing the electrical AND combination of signals $\overline{R}_1$ (logical inverse of $R_1$) and $R_3$ resulting composite signals will be developed that will be indicative of certain features or patterns of a character being scanned such as, for example, the shaded areas 51 and 52 manifested in FIGURE 2 and the shaded areas 53 and 54 shown in FIGURE 3. These features or patterns always stand out regardless of whether the stroke width is of a narrow or thick nature as evidenced by FIGURES 2 and 3. Thus one may readily employ such a system, employing an overlapping duplicate scanning of the image of a character, for recognizing or aiding in the recognition of certain selected features or patterns in identifying characters being read, regardless of variances in stroke width of the character, provided only that the stroke width of the character must not be less than the distance *d* in the present embodiment only. Due to the presence of the unique features or patterns derived from the employment of the system being described, characters having many similar features or patterns in common, which are not easily discriminated by conventional optical character recognition systems, may be readily differentiated from each other, such as the differences in FIGURE 4 between characters 55 and 56 (D's and O's); characters 57 and 58 (V's and W's); characters 59 and 61 (D's and zero's), and the characters shown in FIGURES 5*a* and 5*b*.

It will be appreciated that the present invention is not limited to the use of the optical character recognition equipment shown in FIGURE 1, as the said invention may be employed with magnetic character recognition equipment wherein the slits 32 and 33 may be replaced by dual reproduction gaps in a magnetic head, or by employing apparatus to split the signal received from a magnetic head or optical scanner and thereafter delaying one of the signals by conventional delay techniques.

There is illustrated in FIGURE 6 a schematic circuit diagram of an embodiment of the present invention for detecting certain character features or patterns characterized by the overlapping superimposition of two sets of electrical signals representative of the scanning of the same character. In this exemplary embodiment, recognition pulses $R_1$ and $\overline{R}_3$ (the latter being the logical inverse of $R_3$ obtained by applying pulses $R_3$ to inverter 60) derived from a scan of the character are coupled to measuring unit 72 by way of AND gate 71, the output of which is coupled to AND gates 73, 85, and primer 74. The units used throughout this specification are identical with those fully disclosed in co-pending U.S. Patent application Ser. No. 355,149, filed by David H. Shepard et al. on Mar. 25, 1964, entitled, Apparatus for Reading. Each primer is a bistable unit used to produce a continuous output pulse after the input is enabled, the output pulse remaining continuous regardless of the application of subsequent input signals to the primer until the unit is reset. An exemplary embodiment of the measuring unit 72 is also disclosed in detail in said co-pending U.S. Patent application Ser. No. 355,149, the measuring unit being employed to eliminate and initial portion of the recognition pulse R by a time factor, in the preferred embodiment of 1 to 2 microseconds.

Similarly, recognition pulses $R_3$ and $\overline{R}_1$ derived from a scan of the character, the $\overline{R}_1$ being obtained by applying $R_1$ pulses to inverted 70, are coupled to measuring unit 75 by way of AND gate 76, the output of which is coupled to AND gates 77 and 84. The measuring units 72 and 75 to be set for a time period sufficient to perform the primary function of erasing or washing out extreme beginnings of recognition signals resulting from logical combinations of the $R_3$-minus-$R_1$, and $R_1$-minus-$R_3$ signals, denoted by areas 64 and 65 respectively (see FIGURES 2 and 5).

The primer 74 is coupled to AND gate 79 via inverter 78, there being further connected to the input of AND gate 79 a signal $T_f$ heretofore described, which denotes the end of each scan of one of radial slits 29 across the fixed slits 32, 33, and a signal $G_c$ denoting the beginning and continuation of $R_1$ signals signifying the continuing presence of a character within the scanning field. The $G_c$ signal is coupled to AND gate 79 by way of measuring unit 81 set to eliminate an initial portion of the $G_c$ signal. Stating this initial portion to be eliminated in terms of distance, the present embodiment has been found to suitably function where the eliminated distance, designated as $L_2$ (shown in FIGURE 5*a*), is slightly greater than the difference between the maximum designed stroke width of the character image to be scanned and the distance *d*. The distance $L_2$ has been found to be equal to approximately twenty percent of the time necessary for scanning an entire character width. The distance $L_2$ is utilized to resolve where the median of the composite signals $R_1$ and $R_3$ occurs in order to determine on which side of the character, left or right, the features and/or patterns appear, as will hereinafter become readily apparent to the reader. AND gate 79 is connected to primer 82. The primer 82 output is coupled to inverted 83, to AND gates 73 and 77 and to differentiator 105. The inverter 83 output is coupled to AND gates 84 and 85. The AND gates 73 and 84 are connected to OR gate 86, the output of which is connected to both measuring unit 87 and primer 88. The measuring unit 87 is coupled to both special measuring unit 91 and inverter 92 via primer 89. Inverter 92, primer 88, and signal source $T_f$ provide the inputs for AND gate 93, whose output is coupled to OR gate 94 and AND gate 102.

In a similar manner AND gates 77 and 85 are coupled to OR gate 95 whose output is connected to both measuring unit 96 and primer 97. The measuring unit 96 is connected to inverter 99 by way of primer 98. Inverter 99, primer 97, and signal source $T_f$ supply the input for AND gate 101, whose output is coupled to AND gate 102 and OR gate 94. The input of OR gate 103 is coupled to primers 88, 97 and signal source $\overline{T}_f$ (the logical inverse of $T_f$) and its output provides one input for AND gate 104, the other input to AND gate 104 being derived from primer 82 by way of a differentiator unit 105. The output of AND gate 104 is connected to special measuring units 91 and 106 for reset purposes as will be hereinafter described. Differentiator 105 will cause a negative going pulse to be emitted upon occurrence of the leading edge of a positive going pulse at its input. The input of special measuring unit 106 is derived from OR gate 94 and AND gate 102, while its output is connected to AND gate 131 and primer 108. Primer 108, and primer 107 connected to the output of measuring unit 91, are reset by a signal from AND gate 109 when enabled by signals from differentiator 105 and signal source $\overline{T}_{cd}$ (occurring slightly delayed in time, after the conventional end-of-character signal $T_c$).

The schematic circuit of one embodiment of the special measuring units 91 or 106 is illustrated in FIGURE 7. The main difference between these special measuring units and the other measuring units referred to, resides in the plurality of inputs and the faster charging capability. Referring to FIGURE 7, input signals are applied to input terminals 109 and 111, connected to diodes 112 and 113 respectively, thence to diodes 116 and 117, the intermediate points between the anodes of series connected diodes 112, 116, and 113, 117 being tapped and coupled to a voltage potential of approximately 20 volts through resistors 114 and 115 respectively. The cathodes of diodes 116 and 117 are both connected to the grid of tube 122 and the anode of diode 118, the latter being coupled to one side of capacitor 119 whose other side is connected to ground. A reset pulse is applied to input terminal 120 connected to the cathode of diode 121, whose anode is connected to the lead between diode 118 and capacitor 119. The plate of tube 122 is connected to a positive potential at terminal 123 through resistor 126. Signals at the plate of tube 122 are tapped at junction 127 and coupled to an inverter 124, the output of which is connected to terminal 125. In operation the capacitor 119 will be charged by input signals at either terminals 109 or 111, and will retain its charged state unless discharged by a negative level potential reset pulse at terminal 120. Thus, the capacitor will charge twice as fast if signals are simultaneously at both input terminals 109 and 111. The RC network former by capacitor 119 and resistors 114 and 115 is adjusted for a certain time period as will hereinafter be described for raising the charge on capacitor 119 reflected at the grid of tube 122 to the necessary voltage level to cause tube 122 to conduct, producing current flow which reduces the potential at junction 121 to produce a positive signal at output terminal 125.

As shown in FIGURE 6, AND gate 131 is coupled to the output of primer 107 via inverter 132, to the output of special measuring unit 106, and to inverter 83. The output of AND gate 131 is connected to primer 133, the output of which is routed to output terminal 134 by way of inverter 135, and is also routed directly to output terminal 136. The AND gate 137 input is coupled to primer 108, inverter 132, and pulse source T*cp* (occurring prior in time to the signal $T_c$ and at the extreme right edge of the character). The AND gate 137 output is connected to primer 138, the output of which is routed to output terminal 141 by way of inverter 139, and is also routed directly to output terminal 142.

The lead intermediate primer 89 and special measuring unit 91 is tapped and connected to AND gate 143 and inverter 154. A $G_c$ signal source provides a second input to AND gate 143 and the input to measuring unit 144. The AND gate 148 input is coupled to AND gate 143 by way of primer 145, to measuring unit 144 via inverter 146 and differentiator 147, and from a source of the signal $\overline{2}$X. Differentiator 147 will cause a positive going pulse to be emitted upon occurrence of the trailing edge of a positive going pulse at its input. The signal represented by $\overline{2}$X denotes that there were no two crossings of strokes in any one vertical scan line, during a period of at least three to four consecutive vertical scan lines. Such a type of signal, and apparatus for achieving the same, are adequately described in U.S. Patent No. 2,897,481 granted to David H. Shepard on July 28, 1959. The AND gate 148 output is connected to primer 149, the output of which is routed to output terminal 152 by way of inverter 151, and is also routed directly to output terminal 153. The AND gate 156 input is coupled to a signal source T*cp*, and to inverter 154 via measuring unit 155. The output of AND gate 156 is connected to primer 157, the output of which is routed to output terminal 159 by way of inverter 158, and is also routed directly to output terminal 161. Primers 74, 88, 89, 97, 98 are all reset by signal source $\overline{T}fd$ (occurring slightly later in time than the leading edge of $T_f$, and being negative within the $T_f$ positive pulse period), while primers 82, 133, 138, 145, 149 and 157 are reset by signal source $\overline{T}cd$.

The circuitry illustrated in FIGURE 6 is designed to isolate the overlapping portions of the composite character image and examine those portions for such features or patterns as: round left, round right, long vertical left, and long vertical right, which feature denotations will become readily understood by the reader from the ensuing discussion. The "right" features occur to the right of a vertical center line of the composite character image and the "left" features occur to the left of this vertical center line. In the preferred embodiment, a character with a round left or right side is defined as one that has seven scanning frames of rounded portions on their respective sides of the duplicate overlapping images and not three or more frames of long verticals, as illustrated in FIGURES *5a* and *5b*. In operation, assuming that the character being scanned is shown in FIGURE 2 or in FIGURE *5a*, it will be observed that the siganls $R_3$, representative of the character image, passing through fixed slit 33, and the signals $R_1$ passing through fixed slit 32 representative of the character image at a later period in time, are subtracted from each other, allowing only the overlapping portions of the characters to remain for subsequent analysis. Signals $R_1$ and $\overline{R}_3$ are logically added by AND gate 71, effectively resulting in signals representative of only the shaded areas 62 and 66 of FIGURE *5a*, these signals being further reduced, as represented by the areas 65, by the measuring unit 72 for washing out or counteracting the possibility of slight misalignment between the duplicate overlapped character images. In the same manner signals $\overline{R}_1$ and $R_3$ are logically added by AND gate 76, effectively resulting in signals representative of only the shaded areas 51 and 52 of FIGURE 2, these signals being further reduced, as represented by the area 64, by the measuring unit 75 for the same purpose described above relative to measuring unit 72.

AND gate 79 will not be enabled until three events occur including first, firing of measuring unit 81 signifying conclusion of $L_2$ time commencing from the first appearance of the $R_1$ signal, secondly, an end-of-frame $T_f$ pulse, and thirdly, the signals indicative of occurrence of a non-overlapping portion of the composite character image, in which latter case the output of inverter 78 will be at a positive going level. It will be observed that all three of the above events will only occur at or about the median vertical line 68—68 of the composite character image because, although $L_2$ period concludes during the left overlap portion 62 firing measuring unit 81, primer 74 (which is reset at the end of every frame) will also have been fired at this time thereby presenting a negative potential signal at the output of inverter 78 and thus at AND gate 79. Therefore, when AND gate 79 is not enabled, the output of inverter 83 will be at a positive potential indicating that the left side of the median 68—68 of the composite character image is being scanned. AND gate 79 is enabled at the approximate vertical center of the composite character image, as the $R_1$-minus-$R_3$ signal will be of insufficient value at this point to fire primer 74 due to the coincidence of the character images (or signals $R_1$ and $R_3$), thereby leaving the output of inverter 78 at a a positive potential. Thus the output of primer 82 will be at a positive potential after signal $T_f$ is present, signal $L_2$ having occurred, denoting that the right side of the median 68—68 of the composite image is being scanned. The right side signal or positive level output of primer 82 will remain until it is reset by the signal $\overline{T}_{cd}$. It becomes apparent that the $L_2$ signal is employed to prevent AND gate 79 from being enabled when a no $R_1$-minus-$R_3$ signal is present at the extreme left edge.

Coincidence of signal $R_1$-minus-$R_3$ and a "right side" denoting signal from primer 82 will enable AND gate 73, and coincidence of signal $R_3$-minus-$R_1$ and a "left side" denoting signal from inverter 83 will enable AND gate 84, thus either right or left outside signals, respectively representing outside non-overlapping portions of the character images, will emanate from OR gate 86. In a like manner, coincidence of signals $R_1$-minus-$R_3$ and "left" side signals from inverter 83 will enable AND gate 85, and coincidence of signals $R_3$-minus-$R_1$ and "right" side signals from primer 82 will enable AND gate 77, thus presenting either right or left signals, respectively, representing inside non-overlapping portions of the character images, which will emanate from OR gate 95. The signals from OR gate 86 are measured by measuring unit 87, and if of sufficient duration to qualify as a long vertical *y* (shown in FIGURE *5b*), the output of unit 87 goes positive, which signal is stored for the duration of the frame in primer 89.

The primer 88 output, fired by signals from OR gate 86, together with a $T_f$ signal, and a positive level signal from inverter 92, will enable AND gate 93 whereupon AND gate 93 will be driven high, signifying recognition in the outside non-overlapping portions of the composite character image, provided there is no long vertical indicated measuring unit 87. In a like manner, the signals from OR gate 95 are measured by measuring unit 96, set for recognition of a medium vertical, and if of sufficient duration, the output of the unit 96 goes positive which signal is stored for the duration of the frame in primer 98. Coincidence of signals from primer 97, inverter 99 and signal $T_f$ will enable AND gate 101, denoting recognition in the inside non-overlapping portions of the character images and the absence of medium verticals at such locations.

OR gate 94 will pass either of the signals, recognition outside and no long vertical from AND gate 93, or recognition inside and no medium vertical from AND gate 101, to step up the grid potential of the measuring unit 106 heretofore described. The aforesaid signals from AND gates 93 and 101 are further employed to enable AND gate 102 for also stepping up the grid potential of measuring unit 106. It should be noted that if a positive signal level from OR gate 94 is present, unit 106 will be stepped up a count or selected level at any one time period; however should a coincident positive level from AND gate 102 also be present, the unit 106 will be stepped up twice the count of aforementioned level within the same period. This allows the measuring unit 106 to assign different weights to the information it receives. It is necessary, in the preferred embodiment, for seven frames or counts to step up the grid potential of measuring unit 106 in order to fire the same. Due to the fact that the above routines are utilized for each of the right and left side criteria, it is necessary to reset measuring units 91 and 106 near the center of the character being scanned, which resetting operation will only occur when a negative potential signal is present at the output of AND gate 104. Differentiator 105 will generate a negative pulse at the time the output of primer 82 switches voltage levels. Thus from primer 82 and the other inputs to AND gate 104 it will be observed that a negative reset pulse will be generated from AND gate 104 when there is not recognition in the inside and outside non-overlapping portions of the character images or when primer 82 switches voltage levels due to shifting the scanning from the left to the right side of the character images.

One of the requirements of a "round right" and a "round left" in the absence of a long vertical for three frames. Measuring unit 91 counts frames of long verticals and requires three frames, prior to being reset by the output of AND gate 104, before it is fired. If measuring unit 91 should be fired, its signal output will be stored in primer 107, which latter primer is reset by a negative level signal from the output of AND gate 107 occurring at the end of the left hand side of the character images being read and/or occurring at the $\overline{T}_{cd}$ signal. In order for a character to be considered as having a "round left" it must have certain required patterns or features including at least seven frames of rounded portions on the left side (signified by a high level signal from measuring unit 106), the absence of three frames of long verticals present during the left side period (signified by a high level signal from inverter 132), and a high (left side) level signal from inverter 83, thereby enabling the AND gate 131 and thus firing primer 132 to denote the presence of a "round left" in the character being scanned, at output terminal 132 When primer 133 is not fired, its inverted counterpart at output terminal 132 denotes the absence of a "round left." In like manner, for a character to be considered as having a "round right" it must have certain required features including at least seven frames of rounded portion on the right side (signified by a high level signal from measuring unit 106 and thus primer 108, reset at the end of the right side) the absence of three frames of long verticals during the right side period, and a T*cp* signal, to thereby enable AND gate 137 and thus primer 138 to denote the presence of a "round right" in the character being scanned, at output terminal 142. When primer 138 is not fired, its inverted counterpart at output terminal 141 denotes the absence of a round right.

In the present embodiment, the long vertical left condition requirements comprise a long vertical in the $R_3$-minus-$R_1$ outside non-overlapping portion occurring in the first three frames of $R_3$, and an absence of two crossing ($\overline{2X}$) grouped in the first four frames of the $R_1$ character-image signals. To indicate whether these requirements are met, the long vertical right signal, if present in primer 89, is gated by signal $G_c$ at AND gate 143 to fire primer 145. $G_c$ is also employed to charge and fire measuring unit 144. However, measuring unit 144 is set to only come up immediately after four scanning frames from the left edge of the character image producing signals $R_3$, and the inverted output of inverter 146 then triggers differentiator 147 causing a positive output pulse which, when combined with a high level signal from primer 145 and a high level signal indicative of $\overline{2X}$, will enable AND gate 148 to fire primer 149 and denote at output terminal 153 the presence of a long vertical left in the composite character image. When primer 149 is not fired, its inverted counterpart at output terminal 152 denotes the absence of a long vertical left.

The long vertical right condition requirements in the present embodiment comprise a long vertical in the $R_1$-minus-$R_3$ non-overlapping portion of the character in any one of the last three scanning frames of the right side. To indicate whether these requirements are met, the primer 89 low level output is indicative of the absence of a long vertical and this signal is inverted by unit 154 and, if this condition should be sustained for the last three frames, the measuring unit 155 is fired and gated via AND gate 156 by the right edge sampling pulse (T*cp*) to fire primer 157, denoting at output terminal 161 the absence of a long vertical right. However, should a long vertical right appear in any one of the last three frames, measuring unit 155 will not be fired and output terminal 159 will denote the presence of a long vertical right in the character.

There is illustrated in FIGURE 8 duplicate images of a character W which may be produced in accordance with an alternate embodiment of the present invention, wherein the images are substantialy superimposed upon each other but with one image staggered relative to the other, point by point, by a distance *d*, and yield electrical scan signals $R_1$ and $R_3$. The non-overlapping portions of the composite character image subsequent to a $R_3$-minus-$R_1$ logical operation, denote features or patterns represented by the shaded areas 166, 167, 168 and 169.

In a manner like that heretofore disclosed, the $G_c$ signal is effectively delayed in time by measuring unit 81 to produce a signal at the end of distance or zone $L_2$ from the commencement of the $R_1$ image. In the same manner the $G_c$ signal may be delayed at predetermined time intervals by similar measuring units, to emit signals at the end of each of the distances $L_1$, C, R and $R_2$ shown in FIGURE 8, to divide the character into a number of vertical zones. Similarly, the $R_1$ character image is divided into a number of horizontally zoned areas, denoted by symbols $T_3$, $T_2$, $T_1$, M, $B_1$, $B_2$ and $B_3$, in that order, from top to bottom. The top of the $R_1$ character image may be located in a previous scan by apparatus and in the manner such as that disclosed in Patent No. 2,978,643 entitled Time Interval Marking Apparatus, by David H. Shepard. Thereafter the remainder of the above listed horizontal zones may be marked off at equal time intervals after first locating the top zone.

In operation, by electrically examining selected compartmental areas, such as the common area of zones $L_1$ and M, it may be readily determined that, as between the two characters V and W (shown in FIGURE 4), W is being scanned. By this scheme, the presence and/or absence of non-overlapping portions as disclosed by composite signals in selected compartmental areas of a character contain features which allow characters to be distinguished from one another.

The hereinbefore described methods and apparatus for producing time-staggered, overlapping duplicate scan images of a character are especially useful in recognizing, or aiding in the recognition of, certain selected features or patterns in identifying characters being read regardless of substantial changes in stroke width of the character.

It is observed that instead of utilizing the two closely adjacent fixed slits 32 and 33 in stationary member 31 as shown in FIGURE 1, for creating the two duplicate signals representative of the character image being scanned, one may simply employ a delay line or record and reproduce the signals, such as on known magnetic means, at predetermined delayed intervals, and perform the logical operations as described above. Furthermore, a composite of more than two delayed sets of signals representative of the character could be employed for producing unique patterns and/or configurations rather than two sets of signals as shown.

While preferred embodiments of the invention have been shown and described, various modifications may be made therein without departing from the spirit and scope of the invention, and it is desired, therefore, that only such limitations shall be placed on the invention as are imposed by the prior art and set forth in the appended claims.

What is claimed is:

1. Scanning apparatus for use with automatic character sensing equipment and the like comprising means for scanning the area of a character to be read along scan lines crossing the character and producing therefrom a scan signal for each intercept of the character with the scan lines, the plurality of said scan signals produced during the scanning of the whole character forming a first scan signal set recording the set of scan line intercepts of the whole character, means for producing a second scan signal set duplicating the scan signal content of said first scan signal set with the constituent scan signals of said second set occurring in predetermined time delay relation to the corresponding constituent scan signals of the first set and a portion of said second set occurring in overlapping time relation to the first set whereby the two scan signal sets provide scan line intercept records collectively defining the composite configuration of two partially overlapped duplicate images of the scanned character, means for producing subtraction operations with said first and second sets to eliminate the scan signals therefrom corresponding to the scan line intercepts for the directly overlying portions of said two partially overlapped images for producing subtraction output signals formed of scan signals for only the non-overlying portions of said two partially overlapped images, and means responsive to said subtraction output signals for recognizing the presence or absence of scan signals defining the scan line intercepts of selected distinctive configurations for identifying the character.

2. The combination recited in claim 1 wherein the time delay relation of said second scan signal set is a predetermined time period substantially less than the time period duration of said first scan signal set.

3. The combination recited in claim 1 wherein said means for scanning the area of a character to be read comprises optical character recognition means for scanning an image of a character to be read, and said means for producing said first and second scan signal sets comprises a stationary member having a pair of fixed slits selectively spaced from each other so that each intersects the same portion of a moving character image being scanned at a different point in time.

4. The combination recited in claim 1, including means for producing not-function signals denoting the absence of scan signals defining the scan line intercepts of selected character-denoting configurations in said first and second scan signal sets, said means for performing subtraction operations comprising AND gate means and means for applying said first scan signal set and the not-function signals of said second scan signal set and the said second scan signal set and the not-function signals of said scan signal set to said AND gate means for producing logical AND combinations thereof.

5. The combination recited in claim 1 wherein said selected distinctive configurations comprise selected features which are present in other like characters regardless of substantial changes of stroke widths in said other like characters.

6. The combination recited in claim 5 including means for determining on which side of the character said selected distinctive configurations are absent or present.

7. The combination recited in claim 1 wherein said selected distinctive configurations comprise patterns in the nature of round character portions and long vertical character portions on selected sides of a character as defined by said subtraction output signals.

8. The combination recited in claim 7 wherein said selected sides of a character comprise the right and left sides of a median of the character being scanned.

9. The combination recited in claim 1, including means for nullifying effects of small unidirectional misalignment of said means for producing said first and second scan signal sets.

10. The combination recited in claim 1 wherein the time delay relation of said second scan signal set is a predetermined time period less than the time period required by a number of said scan lines to scan a portion of a said character.

11. The combination as recited in claim 10 where said portion of a character corresponds to the minimum anticipated stroke width of the character.

12. Scanning apparatus for use with automatic character sensing equipment and the like comprising optical character recognition means for scanning the area of a character to be read, a stationary member containing a first slit and a second slit, each of which slits intersects a moving character image being scanned, means for producing a first set of scan signals from said first slit and a second set of scan signals from said second slit, each of said set of signals being characteristic of the character scannned, said first slit being spaced from said second slit for causing said second set of signals to be delayed for a predetermined time period relative to the commencement of said first set of scan signals and yet be partly coextensive in time therewith, means for performing logical operations with said first set and second delayed set of scan signals for producing composite signals therefrom characteristic of unique features relative to the character which unique features comprise selected features which are present in other like characters regardless of substantial changes of stroke widths in said other like characters, and means for determining on which side of the character said unique features are present or absent for identifying the character.

13. Scanning apparatus for use with automatic character sensing equipment and the like comprising means for scanning the area of character to be read and producing at least a first set and second set of scan signals, each of said sets of signals being characteristic of the configuration of the whole character scanned, means causing said second set of scan signals to be delayed for a predetermined time period relative to the commencement of said first set of scan signals and yet be partly coextensice in time therewith, means for performing substraction operations with said first set and second delayed set of scan signals for producing subtraction output signals therefrom for only the non-overlying portions of the two partially overlapped character configurations characterized by the two sets to provide signals characteristic of selected unique configuration patterns present in said non-overlying portions, means for dividing the character image into a plurality of compartmental areas, and means for associating said unique patterns with selected ones of said compartmental areas of the character image for identifying the character.

14. Scanning apparatus for use with automatic character sensing equipment and the like comprising optical character recognition means for scanning the area of a character to be read, a stationary member containing a first slit and a second slit, each of which slits intersects a moving character image being scanned, means for producing a first set of scan signals from said first slit and a second set of scan signals from said second slit, each of said sets of signals being characteristic of the character scanned, said first slit being spaced from said second slit for causing said second set of signals to be delayed for a predetermined time period relative to the commencement of said first set of scan signals and yet be partly coextensive in time therewith, means for performing logical operations with said first set and second delayed set of scan signals for producing composite signals therefrom characteristic of unique features relative to the character which unique features occur in other like characters regardless of substantial changes of stroke widths in said other like characters, means for dividing the character image into a plurality of compartmental areas, and means for associating said unique features with selected ones of said compartmental areas of the character image for identifying the character.

References Cited

UNITED STATES PATENTS

| | | | |
|---|---|---|---|
| 3,167,744 | 1/1965 | Rabinow | 340—146.3 |
| 3,177,469 | 4/1965 | Chow | 340—146.3 |
| 3,178,688 | 4/1965 | Hill et al. | 340—146.3 |
| 3,196,395 | 7/1965 | Clowes et al. | 340—146.3 |

MAYNARD R. WILBUR, *Primary Examiner.*

J. E. SMITH, J. SCHNEIDER, *Assistant Examiners.*